United States Patent

[11] 3,596,287

| [72] | Inventor | Austin G. Cooley<br>Reno, Nev. |
|---|---|---|
| [21] | Appl. No. | 836,817 |
| [22] | Filed | June 26, 1969 |
| [45] | Patented | July 27, 1971 |
| [73] | Assignee | Litton Systems Inc.<br>Beverly Hills, Calif. |

[54] ELECTROMAGNETIC SIGNAL RECORDER OF THE PRESSER BAR TYPE
10 Claims, 10 Drawing Figs.

[52] U.S. Cl.................................................. 346/101, 346/141, 178/6.6
[51] Int. Cl..................................................... G01d 15/00
[50] Field of Search........................................... 346/101, 141, 139 R; 178/6.6 R

[56] References Cited
UNITED STATES PATENTS

| 3,138,426 | 6/1964 | Cooley................... | 346/101 |
| 3,138,427 | 6/1964 | Stein et al.............. | 346/101 |
| 3,138,429 | 6/1964 | Cooley................... | 346/101 |

Primary Examiner—Joseph W. Hartary
Attorneys—John G. Mesaros, Esq., Alan C. Rose and Alfred B. Levine ABSTRACT: A signal recorder provided with a print or presser marking bar for marking a record sheet or blank backed up by a rotating member supporting a helical anvil. The signals to be recorded such as facsimile signals are impressed upon an electromagnetic structure adjacent the presser bar, the magnetic structure embodying U-shaped cores so oriented that the magnetic flux which controls the bar, constituting an armature for the electromagnets, has forward and return paths to the rotating helix member which pass through the body of the bar. The pressure between the presser bar and the helix when the electromagnetic structure is energized by a signal marks the recording blank. The presser bar may be formed with alternate sections of different magnetic characteristics to provide flux paths of higher permeability at the poles of the signal-responsive magnets.

PATENTED JUL 27 1971

INVENTOR.
Austin G. Cooley
BY E. R. Evans
his ATTORNEY

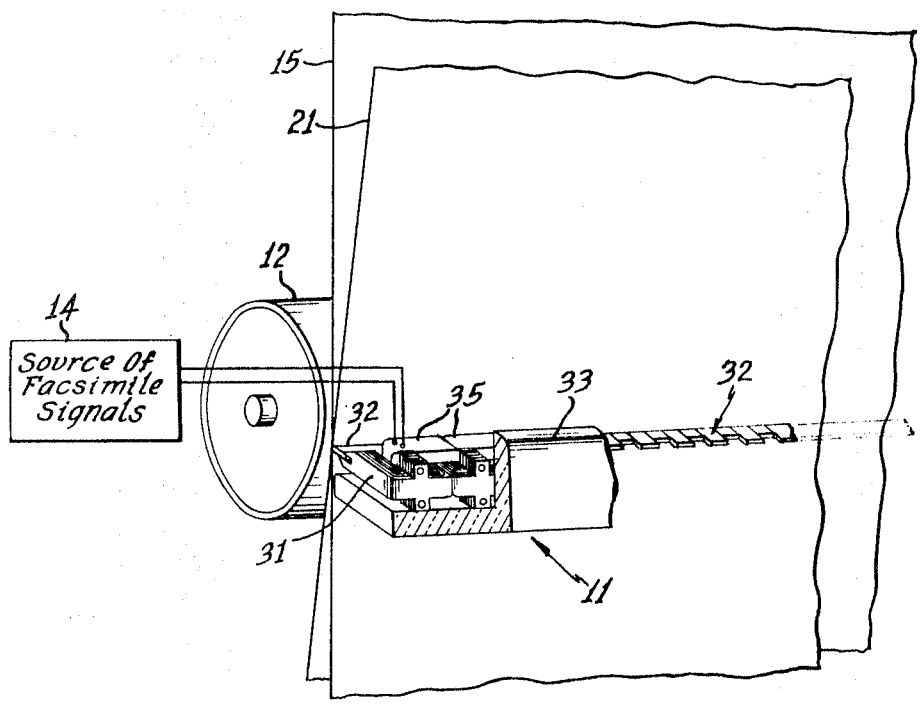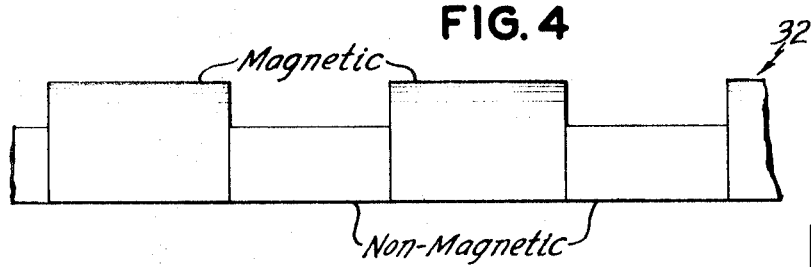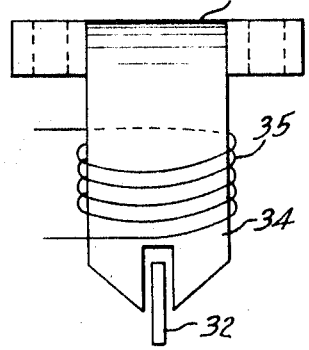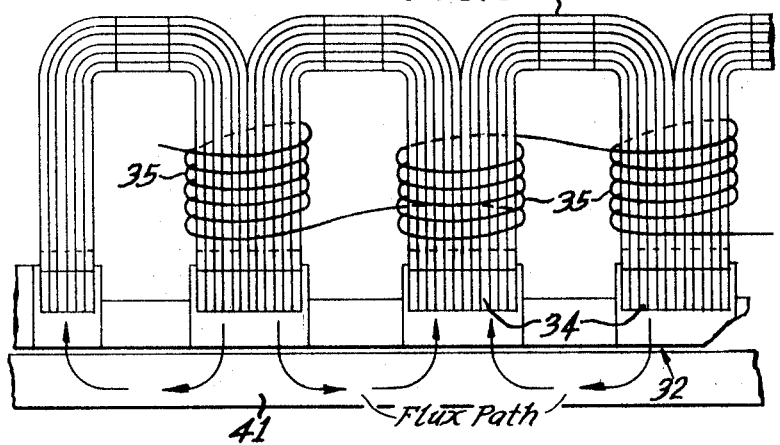

INVENTOR.
Austin G. Cooley
BY E. R. Evans
ATTORNEY

ELECTROMAGNETIC SIGNAL RECORDER OF THE PRESSER BAR TYPE

BACKGROUND OF THE INVENTION

The invention relates to signal recorders, more particularly to facsimile recorders in which subject copy is reproduced by a scanning process in response to successive electrical signals representing elemental area of the subject copy.

The prior art is exemplified by the U.S. Pat. No. 3,138,426 to A. G. Cooley, and U.S. Pat. No. 3,159,710 to L. K. Sorgi, assigned to the assignee of the present invention, and the U.S. Pat. No. 2,785,039 to Artzt. These patents describe various magnetic structures for facsimile recorders of the presser bar type which have certain limitations as to the operating speed, efficiency and cost as compared to the recorder embodying the invention.

SUMMARY OF THE INVENTION

The object of the invention in general terms is to improve the magnetic structure and reduce the size and cost of a signal recorder of the presser bar type. A helical anvil on a rotatable supporting member produces a scanning movement of the marking point. The magnetic attraction of the presser bar against the opposed helix anvil is affected by one or more U-shaped magnetic cores for controlling the presser bar in response to applied signals. The form and arrangement of the elements of the magnetic circuit are such that the magnetic flux from a pole of the electromagnet passes through the presser bar to the helix supporting member and back through another area of the bar to the other pole of the electromagnet. By shortening the flux path in this manner the efficiency of the printing unit is enhanced, the cost and size of the electromagnet are reduced to a minimum, and the signal input required for recording is reduced.

A feature of the invention is a linear presser bar composed of alternate sections of high permeability and resistivity, such as silicon steel, opposite the poles of the electromagnetic cores.

In accordance with another feature of the invention the helix anvil may be mounted on a rotating member, the surface of which is of magnetic material of high permeability in the areas where it forms a path for the magnetic flux from the electromagnet, for example consisting of a narrow strip of steel conforming to the helix conformation but of limited width. Outside the edges of the magnetizable strip, the surface of the supporting drum is covered with plastic or other nonmagnetic material.

BRIEF DESCRIPTION OF THE DRAWING

In the drawing.

FIG. 3 is a partial perspective view of the recording unit embodying the invention;

FIG. 4 is a detail view of the presser bar to an enlarged scale;

FIGS. 5 and 6 are detail views of the presser bar and the electromagnet array for actuating the bar;

DESCRIPTION OF THE PREFERRED EMBODIMENTS

The present invention relates to an electromagnetic or mechanical recorder for the visual recording of subject matter represented by electric signals. The recording mark is produced by the pressure or mechanical impact of a presser bar or printing member on the recording sheet in response to applied signals such as facsimile signals from a facsimile transmitter. The recording material may be a web or sheet of any well known kind comprising for example a paper backing having its surface provided with a pressure-responsive coating. Instead of being a single sheet, the recording medium may consist of two or more similar sheets to produce a similar record simultaneously at the recording areas on all of the sheets. Likewise instead of the recording blank being a sheet of paper with a pressure-responsive coating, the recording material may comprise a sheet of conventional carbon transfer paper in contact with a sheet of ordinary blank paper. These and other recording materials marked by pressure such as duplicating masters or stencils may be used as known in the art. Any of these materials are intended to be defined by the phrase "recording blank."

Figure 1:
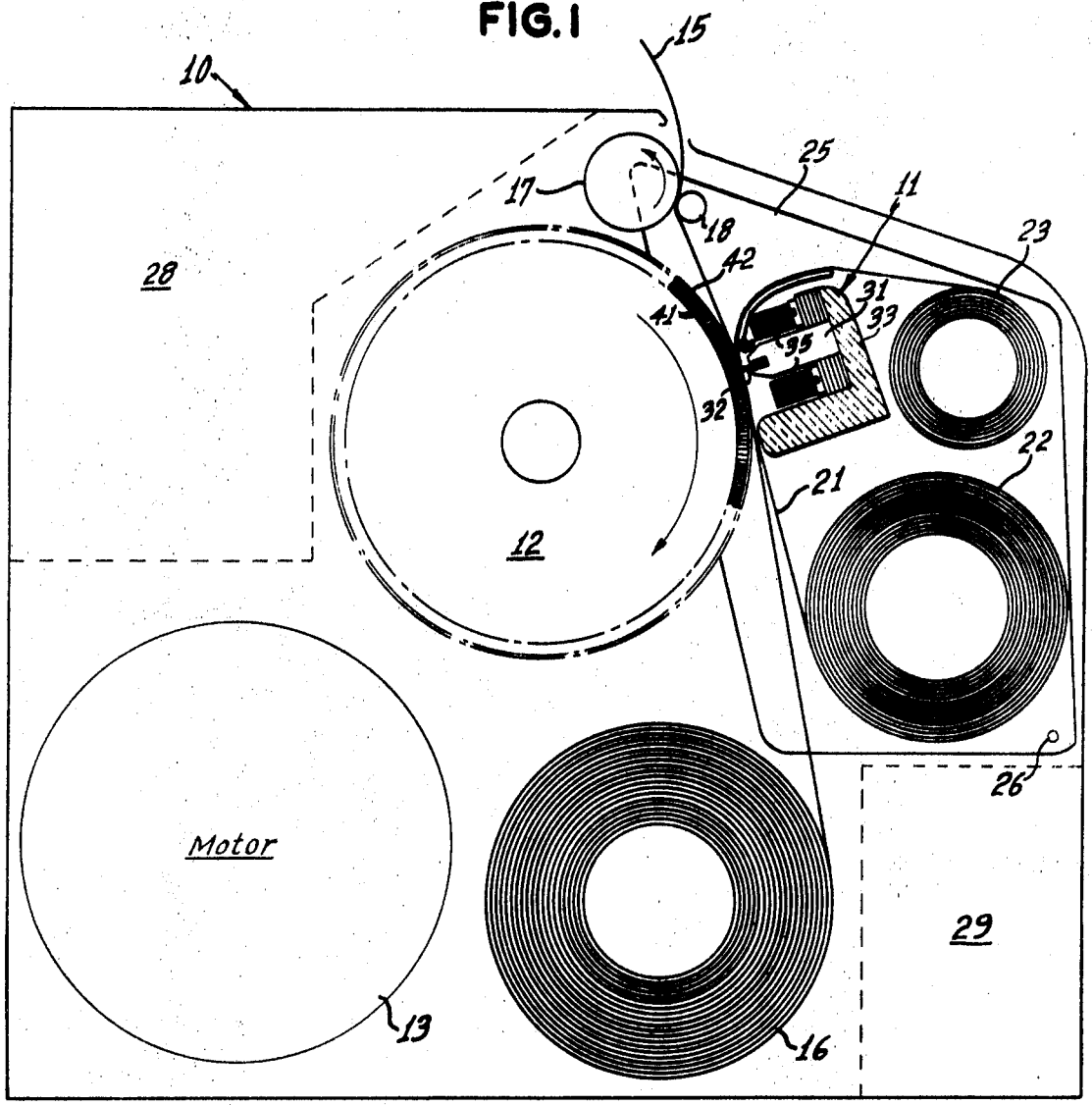
FIG. 1 is an end elevation of the recorder showing the recording unit and sheet-feeding mechanism in detail.

FIG. 1 shows by way of example the novel recording unit embodying the invention together with the conventional motor drive, paper feed and other elements of the recorder mounted in any suitable manner in the casing 10. The recording unit as shown comprises a stationary electromagnetic marking or printing assembly 11 and a rotating backing member or helix drum 12 driven at a synchronous or constant speed by a motor 13, and connected to a source of signals 14, FIG. 3. As shown by way of example, the recording medium consists of a paper sheet 15 reeled off of the supply roll 16 and interposed between the recording unit 11 and the rotor 12. The sheet 15 may be advanced during recording in the usual manner by the motor driven feed roller 17 and pivoted pinch roller 18. By way of example, a sheet of transfer paper 21 is shown as fed from the supply roll 22 over the surface of sheet 15 and maintained taut by the takeup roll 23. For convenience in reloading the recording blank, the stationary marking element assembly 11, the pinch roll 18 and the supply and takeup rolls 22 and 23 are shown as mounted on a pivoted bracket or plate 25 mounted on a pivot 26 in the casing 10 so that the elements mounted thereon may be swung away from the rotor or helix drum 12. This also simplifies the loading of recording blanks consisting of single page assemblies such as a ditto master or a mimeograph stencil with a backing sheet. The insertion of a recording blank in the form of a short sheet requires no tensioning at the bottom of the sheet during recording to hold it in place since the drum or rotor 12 rotates against the movement of the sheet as it is fed through the recording unit.

The usual electronic signal amplifying elements and the usual recorder controls which form no part of the present invention may be disposed in the sections 28 and 29 of the casing 10. The recorded copy is fed through an opening on the top of the casing immediately above feed roller 17 so that the record may be seen shortly after being recorded on the blank. The general arrangement of the elements of the recorder, as shown, is merely by way of example and may be modified to meet any special requirements.

The present invention relates to the electromagnetic recording unit 11 including one or more signal responsive electromagnets 31 and the presser or marking blade 32. The electromagnets 31 are shown as mounted on a supporting bracket 33 extending parallel to the surface of the helix drum 12 across the width of the recording blank. As shown more clearly in FIGS. 3—6, the marking blade 32 is disposed in a series of slots in the poles 34 of the laminated cores of a plurality of signal responsive electromagnets 31 arranged side by side along the edge of the helix drum, where the recording blank is wider than the span of single electromagnet.

The print or marking blade 32 as shown in FIG. 4 consists of alternate magnetic and nonmagnetic sections for example of silicon steel and chromium-iron alloy (stainless steel) respectively, welded together at their edges. The magnetic sections of the blade are each disposed in the slots in the ends of the pole pieces 34 of each adjacent pair of magnets 31 as shown in FIG. 5. The stainless steel sections are welded to the silicon steel sections to form a continuous thin, flat blade. Alternatively the sections of the blade 32 between the magnet poles 34 may be of magnetic material reduced in cross section so that they become saturated and thereby reduce the leakage of the magnetic flux between adjacent poles of the magnet. The resulting one-piece blade is simpler but less efficient.

The cores of the magnets 32 are formed of stacked laminations of silicon steel or other magnetic material, preferably of high permeability and resistivity to form a magnetic path of low reluctance and minimum core loss. Thus, when the magnet cores are energized by the applied electric signals transversing the coils 35, the print or marking blade 32 is attracted to the rotor 12 to mark the recording sheet. As indicated in FIG. 5, the coils 35 are connected in series and wound in such a direction as to generate a magnetic flux in opposite directions in the adjacent pairs of magnet poles. The path for the magnetic flux includes the marking blade 32 to the helix drum or rotor 12 and back through the marking blade at the adjacent pole 34 of the U-shaped magnet. This results in a compact and efficient construction utilizing small electromagnets, a marking member of minimum mass and inertia, and a short magnetic flux path to and from the magnetic active area of the helix drum.

Figure 2:
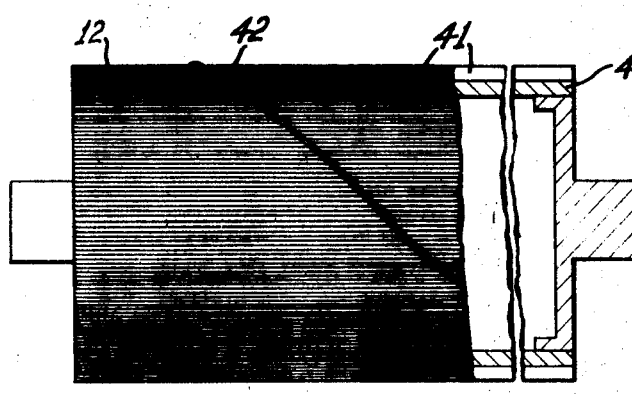
FIG. 2 is a side or top elevation of the backing member or helix drum shown in FIG. 1.

The backing member or rotor 12 is constructed at least in part of magnetizable material to provide a path of low reluctance across the poles 34 of the electromagnets 31. As shown in FIGS. 1 and 2, the helix drum or rotor 12 may consist of a cylindrical tube 40 supporting closely spaced radial strips 41 of magnetic iron on its surface. A helical rib 42 is provided on the surface of the drum for producing a side to side scanning movement of the printing area as the drum rotates. The rib is formed, for example, of a steel or tungsten wire secured in a helical slot at the top surface of the laminations 41. The laminations are attached to the surface of the drum or rotor by an adhesive or cement and provide a bridge magnetic circuit of low reluctance across the poles 34 of the signal controlled electromagnets 31. This construction may be used with other electromagnetic recording assemblies such as that described in my prior U.S. Pat. No. 3,138,426 mentioned above.

Figure 8:
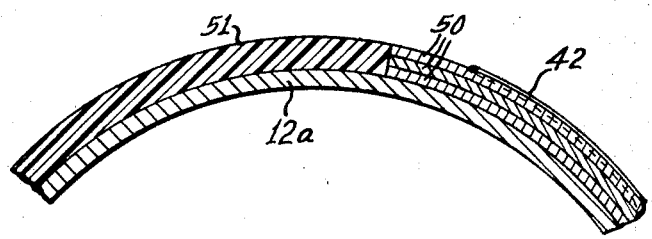
FIG. 8 is a sectional view taken on line 8—8 of FIG. 7.
Figure 7:
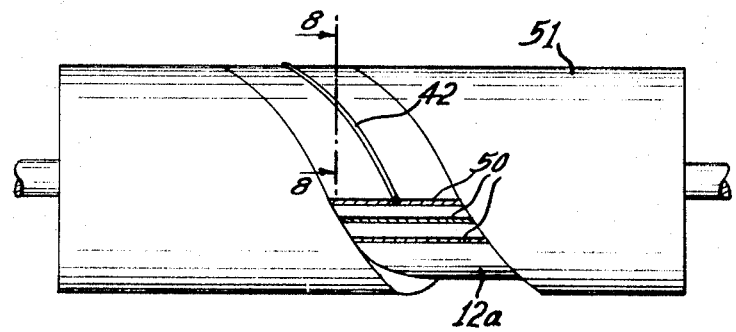
FIG. 7 is a view of a modified helix drum.
Figure 9:
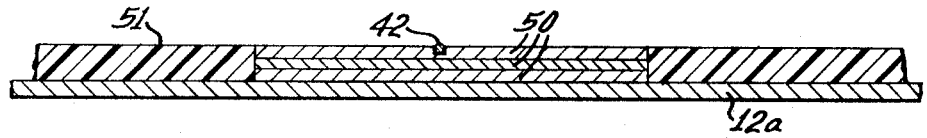
FIG. 9 is a longitudinal section to an enlarged scale of the periphery of the drum shown in FIG. 7.

The rotor or helix drum 12 may be constructed in various ways to provide a short path of minimum reluctance for the magnetic flux from the poles 34 of the signal energized magnets 31. A preferred modification in which laminated strips of silicon steel are wrapped around the surface of the drum is shown in FIG. 7, 8 and 9. In this modification an inner cylindrical member 12a is provided for supporting a plurality of laminations 50 of magnetizable material which lie underneath the helix wire 42. Preferably the laminations 50 are of narrow width to confine the magnetic flux to this area and decrease the magnetic attraction of the presser blade against the recording blank on either side of the helix wire 42. The circumferential laminations 50 may be made by cementing or welding to member 12a a sheet of silicon steel which is wound is several layers around the surface of said member, the sheets being cut away or ground away at the edges of the desired width of the strip. Outside of the edges of the strip, the inner member 12a may be coated or covered with a plastic layer 51 having a thickness substantially equal to that of the magnetizable strip laminations 50. Any suitable nonmagnetic material may be used to form a smooth rotor surface of the desired diameter to avoid undesired marking of the recording blank by occasional tilting movement of the marking blade.

Figure 10:
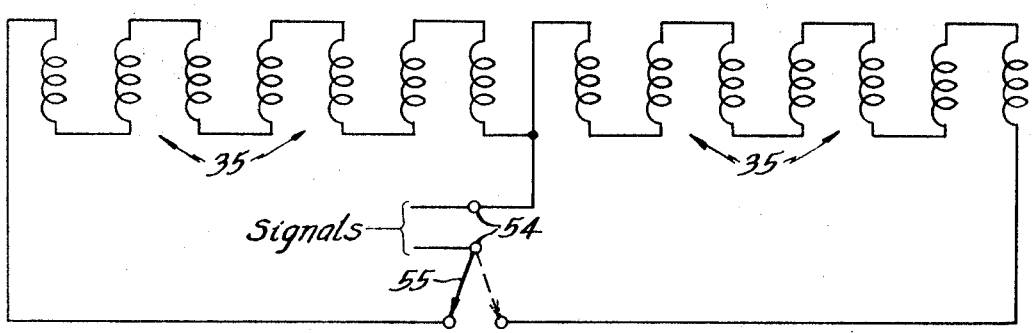
FIG. 10 is a diagram of a typical circuit for the recorder unit electromagnets.

In this case of a signal recorder utilizing an array of electromagnets across the width of the recording blank, the respective electromagnets may be connected in circuit separately or in groups in properly timed relation to the scanning movement of the point of contact between the helix 42 and the recording sheet. Thus, as shown in FIG. 10, the coils 35 may be divided into two or more groups and the incoming signals applied to the terminals 54 may be switched by a mechanical or electronic switch 55 actuated in accordance with the rotation of the helix drum to connect first one and then another group of coils in circuit. Obviously this reduces the power level required to operate the recording unit.

While preferred embodiments of the invention have been shown and described above for the purpose of explaining the underlying principles thereof, various modifications will occur to those skilled in the art and may be made without departing from the scope of the invention.

What I claim is:

1. An electric signal recorder comprising
    an elongated presser bar having a rectilinear edge,
    means to feed a pressure-responsive recording blank past the edge of said bar,
    a movable backing member for the recording blank composed at least in part of magnetizable material and forming an anvil to locate the recording trace, and
    means to press said bar into marking relation to said recording blank in response to electric signals,
    said last mentioned means comprising an electromagnet having a U-shaped core member of magnetizable material having its salient poles in the plane of said presser bar to form a magnetic circuit which includes two spaced sections of said bar and the backing member, and a signal energized coil on said U-shaped core member.

2. An electric signal recorder according to claim 1, in which the salient poles of the U-shaped core member are disposed with their pole faces adjacent the surface of the recording blank and the presser bar is supported at the tip ends of said salient poles of the core member.

3. An electrical signal recorder according to claim 1,
    in which a plurality of electromagnets are mounted in the plane of said presser bar, and
    said presser bar is composed of sections of relatively high and low magnetic permeability along the length thereof.

4. An electric signal recorder comprising
    an elongated presser bar having a rectilinear edge,
    means to feed a pressure-responsive recording blank past the edge of said bar,
    a rotatable backing member for the recording blank including a helix rib forming an anvil for subjecting the blank to marking pressure by said presser bar and means to press said bar into marking relation to said recording blank,
    said last mentioned means comprising a plurality of electromagnets having U-shaped core members of magnetizable material disposed side-by-side in the plane of said presser bar, said bar having spaced sections of low magnetic permeability between the adjacent poles of each core member.

5. An electric signal recorder according to claim 4, in which switching means is provided to connect the electromagnets in circuit in timed relation to the rotation of the backing member.

6. An electric signal recorder comprising
    an elongated presser bar having a rectilinear edge,
    means to feed a pressure-responsive recording blank past the edge of said bar, and
    means to press said bar into marking relation to said recording blank,
    said last mentioned means comprising a plurality of electromagnets mounted side-by-side across the width of the recording blank,
    said electromagnets having U-shaped core members of magnetizable material forming salient magnetic poles disposed with their tips adjacent the surface of the recording blank, the tips of the pole pieces being slotted to receive and guide the presser bar.

7. An electric signal recorder according to claim 6, in which a backing member composed at least in part of magnetizable material is arranged underneath the recording blank at the point of engagement of the presser bar with said blank.

8. An electric signal recorder comprising
    an elongated presser bar consisting of magnetizable sections of low reluctance spaced by alternate sections of reduced cross section, means to feed a pressure-responsive recording blank past the presser bar, a backing member for the recording blank composed at least in part of magnetizable material and forming an anvil for the presser bar, and means to press said bar into marking relation with said recording blank, said last mentioned means comprising an array of electromagnets having U-shaped cores with their salient poles disposed at the low-reluctance sections of said presser bar to form magnetic circuits extending through said low-reluctance sections of said bar and said backing member.

9. In an electric signal recorder of the electromagnetic type, a marking bar having alternate magnetic and nonmagnetic sections along the length thereof.

10. An electric signal recorder comprising an elongated presser bar having a linear marking edge, means to feed a pressure-responsive recording blank past the marking edge of said bar, and a backing member underneath said recording blank and constituting an anvil for said presser bar, said backing member comprising a rotatable substantially cylindrical inner member, a strip of magnetizable material on the surface of said inner member, and a layer of nonmagnetizable material on said inner member along the edges of said magnetizable strip and of substantially the same thickness as the thickness of said strip.